United States Patent [19]
Warnock et al.

[11] Patent Number: 4,592,564
[45] Date of Patent: Jun. 3, 1986

[54] ATV/ATC TOW BAR

[76] Inventors: Rudolph M. Warnock, Rte. 10, Box 336; Thomas G. Alford, Sr., 106 Kings Rowe; Thomas G. Alford, Jr., 316 Sky View La., all of Vicksburg, Miss. 39180

[21] Appl. No.: 662,746

[22] Filed: Oct. 19, 1984

[51] Int. Cl.$^4$ .............................................. B60D 1/14
[52] U.S. Cl. ................................... 280/402; 280/292; 414/563
[58] Field of Search .................. 230/402, 292, 476 R, 230/495; 414/563; 224/42.03 B

[56] References Cited

U.S. PATENT DOCUMENTS

| | | | |
|---|---|---|---|
| 2,789,832 | 3/1957 | Zumwalt | 280/402 |
| 3,430,983 | 3/1969 | Jones | 280/402 |
| 3,744,689 | 7/1973 | Kjeusmo | 224/42.03 B |
| 3,778,087 | 12/1973 | Kallenbach | 280/402 |
| 4,073,506 | 2/1978 | Pressley | 280/402 |
| 4,392,536 | 7/1983 | Iwai et al. | 280/282 |

FOREIGN PATENT DOCUMENTS

| | | | |
|---|---|---|---|
| 2712776 | 9/1978 | Fed. Rep. of Germany | 280/402 |
| 1118396 | 6/1956 | France | 280/402 |

Primary Examiner—John J. Love
Assistant Examiner—Mark C. Dukes
Attorney, Agent, or Firm—Cushman, Darby & Cushman

[57] ABSTRACT

A towing device for directly towing an all terrain vehicle (ATV) or an all terrain cycle (ATC). The towing device is removably secured to the ATV/ATC and allows easy towing and transportation of such a vehicle by utilizing the vehicle's rear wheels thereby eliminating the need for a separate flat bed or wheeled trailer. The tow device is in the form of a bar having an attachment mechanism for removably securing the bar to the ATV/ATC frame and a hitch assembly for removably connecting the tow bar to a car or truck ball hitch or any other type of conventional towing hinge. In one embodiment for a three-wheel ATV/ATC, only one attachment mechanism is provided and the forward end of the towing bar, toward the hitch, includes a recess in which the single front wheel is received. The bar, which can be either one or two pieces, also includes a bend so that when hitched for towing, the front wheel is raised off the ground allowing the rear wheels to provide the rolling support required for towing. A second embodiment of the bar includes a second attachment mechanism located approximately at the bend in the tow bar for attachment to the front frame of a four-wheel ATV/ATC.

8 Claims, 5 Drawing Figures

ATV/ATC TOW BAR

FIELD OF THE INVENTION

The present invention relates to a device for towing three and four-wheeled all terrain vehicles or cycles, generally referred to as ATV's or ATC's.

BACKGROUND OF THE PRESENT INVENTION

Various types of all terrain vehicles have become popular in recent years and include both three and four-wheeled models. While these are very useful vehicles, it is necessary to transport them by some convenient means from time to time for example in order to move them from one's home to the area in which they are going to be used.

One convenient way of providing this transportation is to load the vehicle into the back of a pickup truck. This can be accomplished either by use of ramps or by actually lifting the entire vehicle itself, which requires the assistance of several individuals.

Alternatively, there are various types of hauling trailers available for transporting one or more ATV/ATC's. All can be towed by another vehicle, provided with a suitable hitch mechanism, and all include their own support wheels and suspension systems. Some of these trailers include flat, tiltable beds on which the ATV/ATC is placed, and can haul one or more vehicles. Others are formed with tubular frames beginning with a rear axle on which the trailer's wheels are mounted and the tubular frame then extending forward to a hitching assembly. Reference can be made to pages 56 and 57 of the October, 1984 *Dirt Wheels* magazine, specifically the article entitled "Getting Around-ATV Trailer Buyers Guide" for a recent survey of the types of hauling trailers that currently exist on the market for transporting three and four-wheeled vehicles. However, in each of these, the ATV/ATC is placed on the trailer and no part of the ATV/ATC remains in contact with the ground.

SUMMARY OF THE PRESENT INVENTION

The present invention eliminates the need for a separate trailer and comprises a towing bar that can be removably attached directly to the bottom frame of an ATV. In a first embodiment, designed for a three wheel vehicle, the forward end of the bar is shaped to form a recess to receive the front wheel and is suitably angled so that when the front hitching member is attached to a towing ball, the front wheel will be lifted off the ground. With the tow bar attached in this manner, the rear wheels of the ATV remain on the ground and provide the rolling support for the ATV with the ATV's transmission in neutral. The towing bar is easily attached and the ATV is easily towed. The bar is lightweight and can be provided in either one or two piece versions. In either case, the bar itself is easily storable, and is easily carried in the transporting vehicle or perhaps even on the ATV itself.

In a second embodiment, for use with four wheeled vehicles, a second frame securing mechanism is provided toward the front end of the bar and the shaped front wheel recess is omitted. On four wheel ATV's, frame members are provided between both the front and back set of wheels and each attaching mechanism is connected respectively to one of those frame areas. Here again, the bar itself is angled and when correctly hitched in place to the towing vehicle, the two front wheels will be raised off the ground so that again only the rear wheels remain in rolling contact with the ground and thus provide the rolling support required during towing.

The towing bar can be made out of any of a variety of materials including steel, high strength plastics, or carbon fiber or other fiber reinforced materials. It is essential that the bar be constructed so as to be sufficiently rugged to withstand road shocks and to suitably retain the weight of the towed vehicle.

Other objects, features, and characteristics of the present invention as well as the methods and operation and functions of the related elements of the structure, and to the combination of parts and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION OF THE PREFERRED EMBODIMENTS OF THE PRESENT INVENTION

Figure 1:
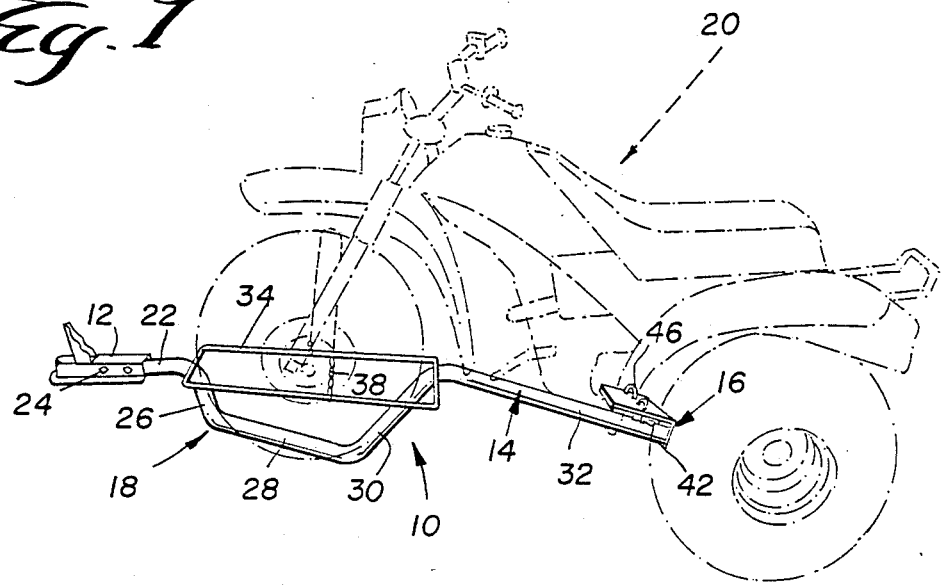
FIG. 1 is a diagrammatic, frontal perspective view of the tow bar according to present invention with that tow bar being shown attached to an ATV, the latter being shown in phantom.
Figure 2:
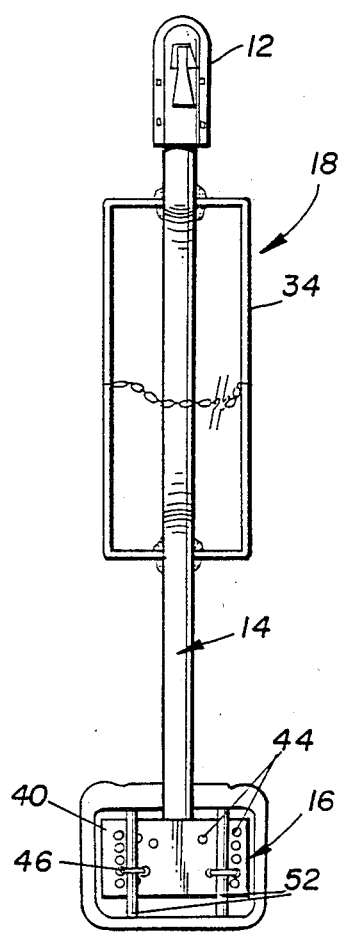
FIG. 2 is a top, plan view of the tow bar assembly shown in FIG. 1.
Figure 3:
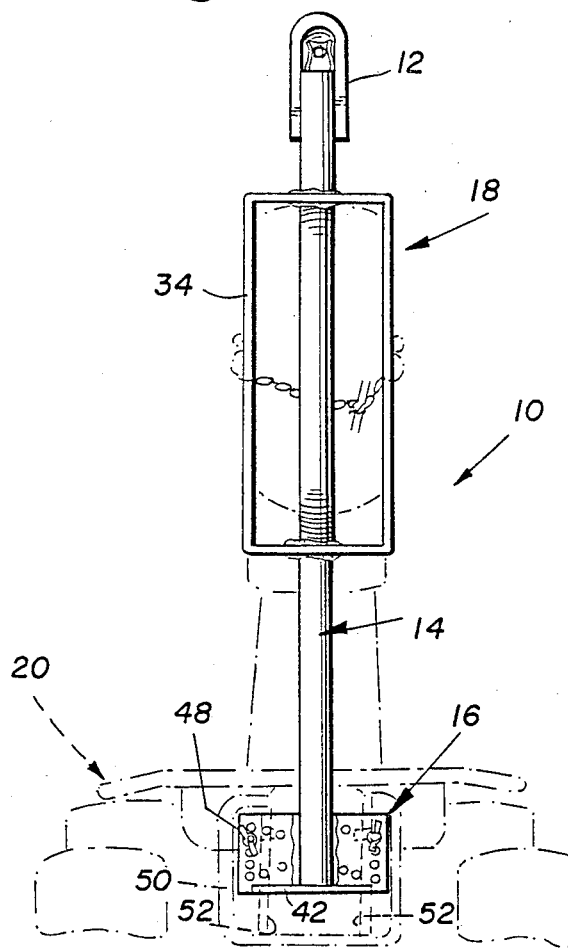
FIG. 3 is a bottom, plan view of the tow bar assembly shown in FIGS. 1 and 2.

With reference first to FIGS. 1, 2 and 3, the tow bar device according to the present invention is generally indicated at 10 and includes a ball hitch assembly 12, the tow bar itself, generally indicated at 14, and shown in the form of a one-piece tubular member, as well as an attaching assembly, generally indicated at 16. In addition, a front wheel retention portion is generally indicated at 18. An all terrain vehicle or all terrain cycle, respectfully referred to in the trade as an ATV or an ATC, is shown in phantom and is generally indicated at 20.

The ball hitch assembly 12 is a conventional type ball hitch, such as a Valley, model No. 5128, manufactured by Shelby Industries. The coupler capacity of ball hitch 12 must be suitable for the load to be carried, such as for example, about 2,000 pounds, with a 200 pound tongue weight.

Tow bar 14 can be constructed from a variety of materials such as including a $1\frac{1}{2}''$–$2''$ diameter steel tube suitable shaped and molded according to the invention. However, other cross-sectional shapes can be employed, as well as solid bar configurations.

Tow bar 14 includes a front, straight portion 22 on which hitch 12 can be suitably attached such as by a pair of bolts 24. The front wheel retention portion 18 is defined by angled bar portions 26, 28 and 30. The angle between the horizontal portion 22 and portion 26 is approximately 40° downwardly from the horizontal axis of portion 22, with the obtuse angle therebetween being approximately 140°. Preferably, bar member 28 can be again horizontally disposed in the same direction as portion 22, although portion 28 could also be at a slight downward angle from horizontal. Bar member 30 is angled upwardly from the horizontal about 40°, making the obtuse angle between members 28 and 30 also approximately 140°. These angles are representative and are not critical as it is only necessary to develop a suitably dimensional recess in the bar to receive the front wheel of the vehicle as shown in FIG. 1.

The tow bar can be about 60 inches long with portion 22 being about 9–13 inches long, 26 being about 9–12 inches long, 28 being about 14–18 inches long and 30 being about 9–12 inches long.

The remaining portion of tow bar 14 is comprised of bar member 32 which is at a downwardly sloping angle away from horizontal with the obtuse angle between members 30 and 32 being approximately 120°–130°. Portion 32 can be about 22–26 inches long.

The front wheel retaining portion 18 also includes a retaining collar or member indicated at 34 which, as shown in FIGS. 1–3, can be welded at the junction points of bar members 22 and 26, and 30 and 32, respectively. Alternatively, as shown in the embodiment set forth in FIG. 4, a retaining collar or member 34' can be removably secured to the towing bar by means of a clamp assembly 36 provided at each end, with a portion of the clamp structure being suitably welded to the retaining collar 34. By mounting the collar 34' in this way, the collar is removable to allow for easier storage or handling. This also permits use of a two-piece tow bar construction as will be more fully discussed below.

Returning again to FIGS. 1–3, attaching assembly 16 is comprised of a horizontal plate member 40 together with a vertical plate 42, shown in FIGS. 1 and 3, with plates 40 and 42 being suitably welded together and to the end of bar 14. Plate 40 is provided with a plurality of apertures as shown at 44 with the arrangement or pattern of these openings being such as will allow easy attachment of the bar to the frame of the ATV. In that regard, as shown in FIG. 3 in phantom, ATV vehicles normally include a tubular bar type frame between the wheels, as shown at 50, which can include inner connected cross-members, with a pair of cross-members being shown at 52. Attaching assembly 16 also includes a pair of J-shaped retaining bolts 46 with the straight portion of the J extending through apertures 44 and being threaded so as to receive a wing nut on the opposite side of plate 40 as shown at 48 in FIG. 3. The J portion positioned on the top plate 40 will be able to fit over the tubular frame portions of frame 50 such as portions 52. Once positioned thereover, the wing nuts can be tightened pulling the vehicle frame and the attaching assembly together thereby clamping plate 40 to the vehicle frame. Once plate 40 is securely clamped to the ATV frame, the front wheel will be positioned in the retaining portion 18 and to assure the front wheel will be retained therein during towing, a retaining chain 38 is provided to extend from one side of collar 34 across the top of the front wheel and to the opposite side of collar 34. A strap or other retaining device can be used in place of chain 38.

Figure 4:
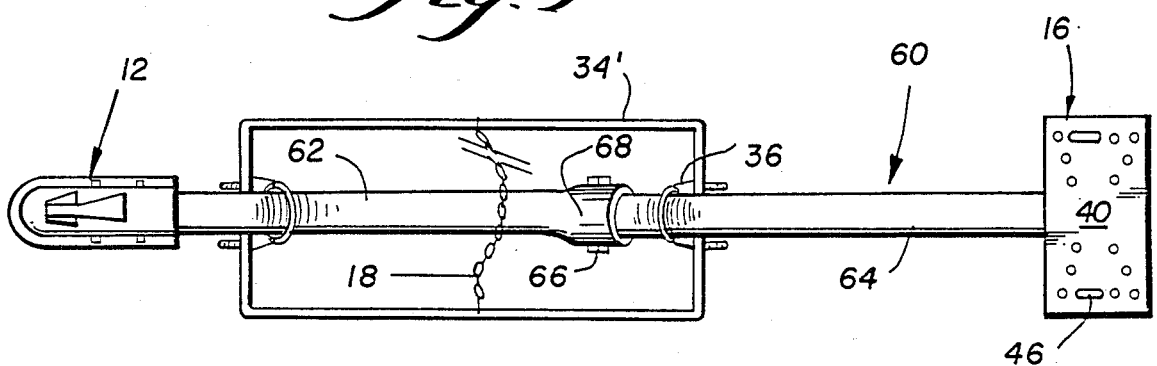
FIG. 4 is a top, plan view of a second embodiment of the tow bar assembly according to the present invention, specifically showing the two-piece construction.

With reference to FIG. 4, the hitch assembly 12 and attaching assembly 16 can be identical to those discussed with respect to the embodiment set forth in FIGS. 1–3. The retaining collar or member 34' has already been discussed and is attached to the bar by means of removable clamps 36. However, the bar, generally indicated at 60, is comprised of two pieces 62 and 64 with the two being joined together by means of a bolt 66.

As shown, bar portion 62 can have an enlarged end 68 for receiving the free end of bar member 64 therein with the fit being preferably very tight so that once bolt 66 is tightened in place, bar members 62 and 64 will be securely held together.

Figure 5:
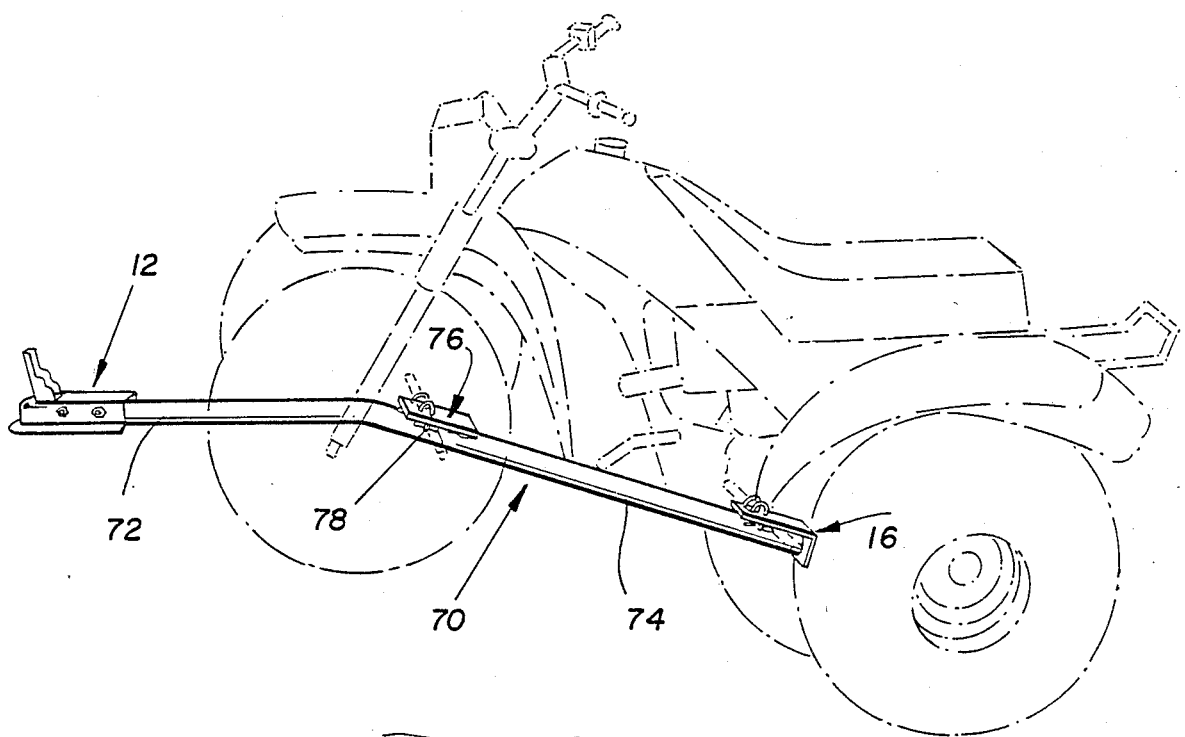
FIG. 5 is a diagrammatic, frontal perspective view of a third embodiment of the present invention designed specifically for a four-wheeled ATV which is shown in phantom.

The embodiment set forth in FIG. 5 is for use with four wheel ATV's or ATC's, and again hitching assembly 12 and attaching assembly 16 can be the same as set forth in the previously discussed embodiments. The tow bar generally indicated at 70 is again a one-piece tubular with a forward horizontal section 72 and a rear angled section 74, the angle therebetween being approximately 160° or about 20° below horizontal.

Positioned just rearwardly of the bend between the front and rear portions 72 and 74 is a second attaching plate 76 with similar J-shaped retaining members 78. This second attaching plate will secure the front portion of the towing device to the vehicle frame structure provided between the two front wheels of the four wheel vehicle set forth in phantom in FIG. 5.

As stated above, the towing device can be constructed from any suitably strong material including steel or reinforced resins or any other type of manmade structural materials. In addition, the towing device can be attached to an ATV or ATC by any means convenient to securely attach the towing device to the vehicle so that during towing, the two will not become separated.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims, which scope is to be accorded the broadest interpretation so as to encompass all such modifications and equivalent structures.

What we claim is:

1. A towing device for towing an all terrain vehicle having at least a forward wheel and a pair of rear wheels, said device comprising a tow bar in the form of a single structural member having a forward section and a rearward section, said forward section having a first substantially straight portion, a second portion connected to and angled downwardly from said first portion, a third portion connected to and angled from said second portion, and a fourth portion connected to and angled upwardly from said third portion, said rearward section having a forward and rearward end with said forward end being connected to and angled downwardly from said fourth portion, the length of said third portion being longer than the length of said second and fourth portions, and the length of said second and fourth portions being about equal so that said second, third and fourth portions together define an upwardly opening recess in said tow bar for receiving said forward wheel, the rearward end of said rearward section having a plate member secured thereto, said plate member having two outer edges and a plurality of spaced apart through holes, said holes being arranged to extend in at least one row along each of said outer edges and spaced inwardly therefrom, means for removably securing said plate member to said all terrain vehicle, hitch means secured to said first portion for removably coupling the towing device to a towing vehicle, a retaining collar secured between the second and fourth portions and being comprised of two spaced apart end members and two spaced apart side members connected together into an integral structure, said retaining collar being positioned so that said side membes lie outboard of said tow bar, said end and side members being respectively spaced apart a sufficient distance to receive said forward wheel therebetween, and wheel holding means for holding said forward wheel within said upwardly opening recess and within said retaining collar.

2. A towing device as in claim 1 wherein said retaining collar is secured by welding.

3. The towing device as in claim 1 wherein said wheel holding means comprises a retaining strap secured to one of said side members of said retaining collar over said forward wheel and at least removably secured to the opposite side member.

4. A towing device as in claim 1, wherein one of the two end members of said retaining collar is secured to said tow bar adjacent the connection between the first and second portions with the other end member being secured adjacent the connection between the fourth portion and the rearward section.

5. A towing device as in claim 1 further including means for removably attaching said retaining collar to said tow bar.

6. A towing device as in claim 5, wherein said forward and rearward sections are comprised of two separate members joined together within said fourth portion and further including means for removably securing said forward and rearward sections together.

7. A towing device as in claim 1, wherein the tow bar is comprised of an integral tubular member.

8. A towing device for towing an all terrain vehicle having two pairs of forward and rear wheels, said towing device comprising a tow bar in the form of a single structural member having a forward section and a rearward section, said forward section comprising a substantially straight portion, said rearward section comprising a substantially straight portion and being positioned at a downwardly angled manner with respect to said forward section so as to define a bend at the juncture of the forward and rearward sections, said rearward section having a rearward end on which a first plate member is secured thereto, said first plate member having two outer edges and a plurality of spaced apart through holes arranged so as to extend in at least a row along each of said outer edges and spaced inwardly therefrom, a second plate member secured to the rearward section of said tow bar adjacent the bend at the juncture between said forward and rearward sections, said second plate having two outer edges and a plurality of through holes provided thereon so that said holes extending along each of the two outer edges and are spaced apart and inwardly of said outer edges, means for removably securing both of said first and second plate members to said all terrain vehicle, and hitch means secured to said forward section for removably coupling the towing device to a towing vehicle.

* * * * *